(12) United States Patent
Fasciano

(10) Patent No.: US 6,757,010 B2
(45) Date of Patent: *Jun. 29, 2004

(54) METHOD AND SYSTEM FOR CALIBRATING COLOR CORRECTION INSTRUCTIONS BETWEEN COLOR CORRECTION DEVICES

(75) Inventor: Peter Fasciano, Natick, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/953,809

(22) Filed: Sep. 17, 2001

(65) Prior Publication Data

US 2002/0018121 A1 Feb. 14, 2002

Related U.S. Application Data

(63) Continuation of application No. 09/543,191, filed on Apr. 5, 2000, now Pat. No. 6,317,153.
(60) Provisional application No. 60/129,619, filed on Apr. 16, 1999.

(51) Int. Cl.[7] .................................................. H04N 17/00
(52) U.S. Cl. ........................ 348/177; 348/182; 348/655
(58) Field of Search ................................. 348/177, 178, 348/179, 182, 183, 184, 185, 186, 645, 646, 655, 656; 345/153, 150, 154; H04N 9/67, 17/00, 9/73

(56) References Cited

U.S. PATENT DOCUMENTS

| | | | | |
|---|---|---|---|---|
| 4,977,398 A | * | 12/1990 | Pleva et al. | 345/639 |
| 5,850,471 A | * | 12/1998 | Brett | 382/162 |
| 5,874,988 A | * | 2/1999 | Gu | 348/97 |
| 5,963,201 A | * | 10/1999 | McGreggor et al. | 345/326 |
| 6,266,103 B1 | * | 7/2001 | Barton et al. | 348/675 |
| 6,317,153 B1 | * | 11/2001 | Fasciano | 348/177 |
| 6,362,808 B1 | * | 3/2002 | Edge et al. | 345/153 |

\* cited by examiner

Primary Examiner—Michael H. Lee
Assistant Examiner—Trang U. Tran
(74) Attorney, Agent, or Firm—Peter J. Gordon

(57) ABSTRACT

Systems and methods for correlating color correction instruction between two color correcting devices are disclosed. The method includes performing a nulling test on a representation a first device has of a known standard and retaining the results of the test. A second color correcting device performs a nulling test on the same known standard and the results of this test are retained. From the results of these two tests a color correction instruction of one of the devices may be converted to a color correction instruction on the other device so that substantially the same color correction effect is achieved.

24 Claims, 10 Drawing Sheets

METHOD AND SYSTEM FOR CALIBRATING COLOR CORRECTION INSTRUCTIONS BETWEEN COLOR CORRECTION DEVICES

RELATED APPLICATION

This application is a continuation of prior application Ser. No. 09/543,191, filed Apr. 5, 2000, now U.S. Pat. No. 6,317,153 which is pending, and claims the benefit of prior filed provisional application No. 60/129,619, filed Apr. 16, 1999. Both applications are entitled Method and System for Calibrating Color Correction Instructions Between Color Correcting Devices, and are incorporated herein by reference.

BACKGROUND

To ensure that each scene of a motion picture has the same basic lighting, a grayscale chart is typically recorded on one or more frames of film or video tape at the beginning of the scene by the camera recording the scene. A grayscale chart (or gamma chart) is a commonly known quality control element having a range of calibrated neutral density (i.e., gray) reflectance values from black to white. These known neutral density reflectances are used during the transfer process to enable film-makers to visually assess and maintain proper color balance, brightness and contrast while also compensating for effects that variables in film stock, film age, and lighting have on the color images.

Images from film may be transferred to video tape or to computer-readable media to be used, for example, in an editing system, such as the Avid Symphony nonlinear editing (NLE) system, where they may be digitally edited. An editor uses the NLE system to create a composition including segments from a digitized version of the film. The data that represents the composition commonly is referred to as "meta-data" and may be stored in a data file or in a database. The digital editing system may provide, for example, a cut list that specifies how the negative may be cut to produce the motion picture. Using the cut list, the negative is then cut and rearranged in the correct order. This negative becomes what is commonly known as the "master negative." The master negative is used to create a final color copy of the motion picture. The final color copy may be used by a transfer device to transfer images from the final color copy to a distribution medium.

After or during transfer of images from film, color correcting is typically performed. This color correction is typically performed by an expert called a colorist. Color correction may be performed using several different devices during the production of a motion picture. For instance, color correction may be performed when film is transferred to video tape or to computer readable media using a telecine. Color correction also may be performed when the film is transferred to various other media such as digital versatile disk (DVD), television signals format (e.g., PAL and NTSC), high definition television (HDTV) format, and the like. For each type of transfer, a different color correcting device may be used. Currently, various color correcting devices and processes are used on an ad hoc basis and operate in isolation.

SUMMARY

Each color correction device has it own characteristics, settings and calibrations so that color correction settings on one color correction device do not create the same result on a different device. To overcome this drawback, information related to the representation of known color standards on both devices may be captured and used to cross-correlate color correction information from one device to color correction information to be used by another device.

In one embodiment, a method which duplicates the effective degree and range of color correction on a second color correction device for a still or moving image previously color corrected on a first color correction device is disclosed. The method of this embodiment includes steps of nulling, on the first color correction device, at least one color corresponding to at least one know color in an image containing a known standard using the first device to obtain a primary offset value on at least one color axis, retaining the control offset in a manner associated with the image, and performing further color correction corrections with the first device on a series of subsequent images, and retaining information related to the further color corrections in a manner associated with the subsequent images. The method of this embodiment also includes steps of nulling, on the second color correction device the at least one color corresponding to that at least one known color in the image containing the known standard using the second device to obtain a secondary offset value on the at least one color axis, receiving the offset on the at least one color axis obtained on the first device, and using the primary and secondary offsets to derive a correlation mapping of color correction control information such that color correction control information may be accurately communicated from the first color correction device to the second color correction device.

In one embodiment, a method duplicating color correction on a second device for an image in a motion picture corrected on a first device is disclosed. The method of this embodiment includes steps of nulling at least one color corresponding to at least one known color in an image containing a known standard using the first device to obtain an offset on at least one color axis, retaining the offset in a manner associated with the motion picture and performing color correction using the first device and retaining information about the color correction. The method of this embodiment also includes steps of nulling at least one color corresponding to the at least one known color in the image containing the known standard using the second device to obtain an offset on the at least one color axis, receiving the offset on the at least one color axis obtained on a first device and using the offsets from the first and second devices to generate a mapping of color correction information from the first device to color correction information for the second device.

In another embodiment, a method of performing color corrections on a motion picture using a color correcting device after color correction operations have been performed on a remote color correction device such that the color corrections conducted using the color correcting device are substantially the same as those performed on the remote color correcting device is disclosed. The method of this embodiment includes a step of receiving the results of a null test performed on the remote device on at least one color corresponding to at least one known color in an image of a known standard. The results may be received as at least one offset on at least one color axis. The method of this embodiment also includes steps of nulling, on the color correcting device, at least one color corresponding to the at least one known color in the image of the known standard to obtain an offset on the at least one color axis and using the offsets from the remote device and the color correcting device to generate a mapping of color correction information from the remote device to color correction information for the color correcting device.

In another embodiment, a method for maintaining color correction information for an image in a motion picture corrected on a first device is disclosed. The method of this embodiment includes steps of nulling at least one color corresponding to at least one known color in an image containing a known standard using the first device to obtain an offset on at least one color axis, retaining the offset in a manner associated with the motion picture and performing color correction using the first device and retaining information about the color correction in a manner associated with the motion picture.

In another embodiment, a motion picture product produced by a process is disclosed. The motion picture product of this embodiment is produced by nulling at least one color corresponding to at least one known color in an image containing a known standard using a first device to obtain a first offset on at least one color axis, retaining the first offset in a manner associated with the motion picture and performing color correction using the first device and retaining information about the color correction in a manner associated with the motion picture. In another embodiment, a color correcting device is disclosed. The color correcting device of this embodiment includes means for receiving color correction information from a remote color correcting device and means for performing color correction.

DETAILED DESCRIPTION

Figure 1:
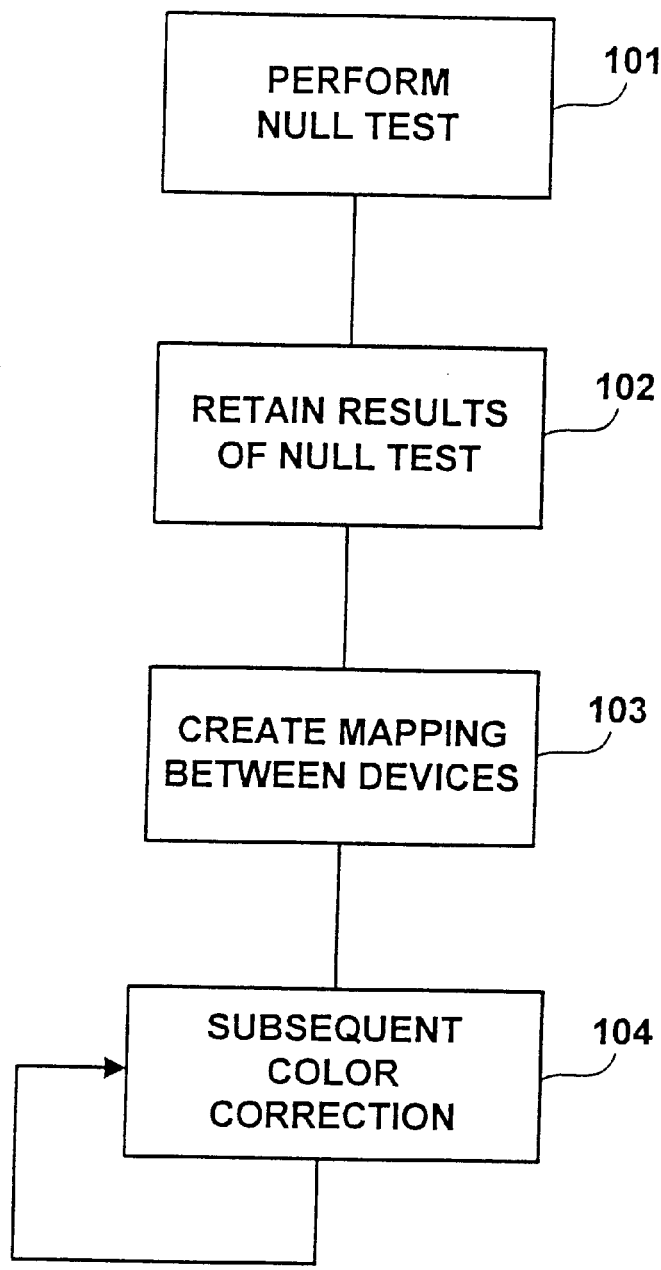
FIG. 1 is a flow chart describing how color correction instructions may be calibrated between two devices.

Every color correcting device may represent and control the appearance of colors present in an input image due to the individual characteristics of the device. The term "color correcting device" as used herein shall refer to any device which may vary or otherwise affect the coloring of an image.

A color correcting device may be part of a transfer device, such as a telecine, which transfers images on film to video tape. The color correcting device may include any number of controls, each control affecting some particular color. For example, the color correcting device may include a master control and a control for each of red, green, and blue. Example color correcting devices also include digital editing systems which have the capability to perform color correction.

According to one embodiment, the representation of at least one color in a known standard that two different color correcting devices have are used to map color correction control settings from one color correcting device to another color correcting device. In this manner, color correction instructions from one color correcting device may be duplicated on a second color correcting device even if the two devices represent or operate on the same color in the known standard in different ways. The term "known standard" refers to any object having a known color or colors. For example, and as described in greater detail below, the known standard could be a color chart.

When a specific input (i.e., a frame of film) is presented to the color correcting device the color correcting device represents the input as a collection of colors which may be displayed in polar format on a color wheel on a vectorscope display. The resultant image displayed on the vectorscope display graphically represents all of the colors, and the intensities thereof, present in the image of the known standard. Every color correcting device has its own representation of the colors present in the image of the known standard. By defining color correction information such that it corresponds to the representations two color correcting devices have of the known standard, color corrections made on one device may be mapped to color corrections to be made on a second device. That is, the operator of the second device, or the device itself, may adjust the controls of the second device in order to perform the same or very similar color corrections as done on the first device.

In one embodiment, a first user adjusts color correction instructions for a motion picture on a first color correcting device. These color correction instructions may be stored in a file of "meta-data" that is associated with the motion picture. Also, and as discussed in greater detail below, the at least one color included in the representation of the known color is nulled along at least one color axis.

The terms nulled, nulling test, nulling operation, and nulling are used interchangeably herein. Most generally, and described in greater detail below, these terms as used herein mean a process by which an operator adjusts, using controls on a correcting device, the representation of an image of the known standard along one color axis until the color is neutralized to a gray scale.

The results of the nulling test(s) may be stored in the file of meta-data. The same nulling test based on a representation of an image of the same known standard is performed on a second color correcting device. The results of the nulling test on the second device also may be stored in the file of meta data. Then, a mapping, based on the results of the nulling tests, is created which maps a specific color correction value implemented on the first device to a corresponding color correction value on the second device. The mapping may be stored in a look-up table or may be obtained by performing a process (described-below) which converts a color correction instruction from the first color correcting device into a color correction instruction that achieves substantially the same color correction if implemented on the second color correction device.

The first user may be, for example, the editor of the motion picture. The editor may notice that the coloring for a given scene, or between scenes, is not consistent. While viewing the finished motion picture, the editor, using known color correction devices, may choose to color correct various scenes. In the past, it was difficult, if not impossible, to explain these changes to an operator of a process where a subsequent color correction may occur (i.e., to the colorist operating a telecine unit).

The color corrections the editor specified on a color correction device (i.e., the file including the color correction information from the first device) may be exported to a second device and these color corrections are carried out on the second device even if the device performs color correction in a manner different from the first device. The color correction performed at the second device may be applied to a process that is converting the motion picture from one type of visual data recording medium to another. However, the color correction may be done in other instances as well, such as tape to tape transfers or converting data from NTSC or PAL television format to High Definition Television (HDTV) format.

FIG. 1 is a flow chart of a method for mapping color correction between two devices. At step 101, a first color correcting device performs a "nulling test" on the representation the device has of an image of the known standard. Then, the controls may be reset back to neutral and another axis is nulled until all desired axes have been nulled. This process may also be conducted automatically by the color correcting device.

The results of the nulling test(s) may then be retained for later use in step 102. The results, for example, may be stored in a file of meta-data associated with the motion picture. However, the results could be retained for future use simply by writing them down on a piece of paper or storing them in a file not associated with the motion picture.

Steps 101 and 102 are also performed on a second color correcting device. The results steps 101 and 102 as performed by the second device may be retained for later use in manners similar to those described above.

After both devices have performed a nulling operation, the results are then, at step 103, used to create a conversion mapping between color correction instructions from the first device to color corrections for the second device and vice-versa. That is, if a color correction that imparts, for example, an amount of blue to a scene is represented by a value X on the first color correction device, the value X may be converted to a value Y which imparts the same amount of blue on the second color correcting device.

After the mapping, which may be stored as a look-up table between the first and second devices, for a particular motion picture has been created, any subsequent color correction operation made on either device, step 104, may be duplicated on the other device. Color correction information implemented at the first device may be transferred to the second device to achieve the same color correction, even if the two devices do not perform color correction in the same manner.

Images of the known standard may be created in a variety of ways. For instance, the known standard may be composed of a plurality of frames of motion picture film that have recorded images of a grayscale chart through various known filters. Filters that are usable for such a process of creating the known standard may include, but are not limited to, Kodak CC filters. The CC filters are optical filters which are graduated along the red, green, blue/cyan, magenta, yellow axes of a color space. As one moves outwardly from the center of a color wheel representation of a color space (e.g., from gray to yellow), the numerical designation associated with the filter increases.

First the grayscale chart is filmed without filters. Then the gray scale is filmed through, for instance, a CC30Y filter. This process is repeated for each of the secondary colors (cyan and magenta). The process also may be repeated for the three primary colors (red, green, and blue). The resulting three to six images, taken collectively, comprise the images of the known standard. In this embodiment, the nulling test is performed to remove the known amount of a particular color the CC filter imparted by comparing the image of the grayscale chart without a filter to an image of the grayscale charge filmed with a filter. The amount of color correction that makes the two images appear the same is the result of the null test and is expressed as an offset as described below.

Figure 2:
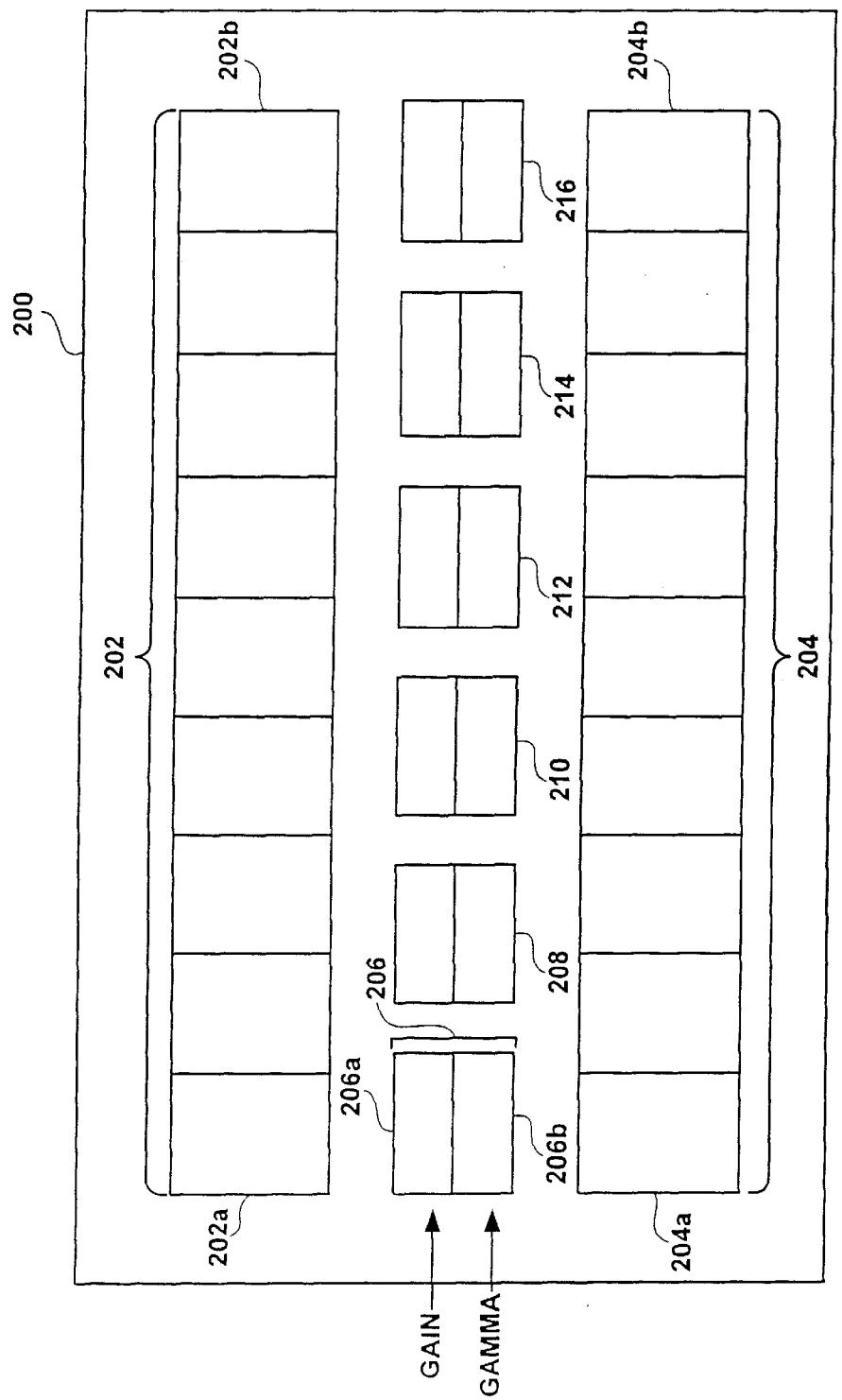
FIG. 2 is an example known standard embodied as a color chart.

FIG. 2 shows an example of another type of known standard 200. The known standard may be filmed at the beginning of the production process and the images of the known standard are used to perform the nulling tests. As shown, the known standard 200 is a "color chart" having a plurality of colors displayed thereon. The color chart 200 of FIG. 2 is shown by way of example only, many other types of color charts may be used. For example, the Macbeth Color Checker or the Cinematographer's Control Chart, from Gamma & Density Co., Inc. are suitable color charts that may also serve as the known standard.

The color chart 200 may include a first grayscale 202. The first gray scale 202 is similar to a traditional grayscale and varies from a black region 202a, though a plurality of various shades of gray until it transforms into a completely white region 202b. A grayscale such as gray scale 202 is well known in the art. The color chart 200 also may include a second gray scale 204 which varies from a white region 204a to a black region 204b in a manner opposite the first gray scale 202.

The color chart 200 may also include a plurality of color swatches. As shown, the color chart includes 6 different color swatches, a red swatch 206, a yellow swatch 208, a green swatch 210, a cyan swatch 212, a blue swatch 214, and a magenta swatch 216. Each swatch may include a gain region and a gamma region. For example, red swatch 206 includes a gain region 206a and a gamma region 206b. In one embodiment, these color swatches are identical to what white and a given gray would look like if viewed through standard CC filters. These swatches may also be calibrated to Pantone Matching System (PMS) printer values that precisely match the effect of CC filters.

The known standard is filmed for each batch of film to be used in the production process of the motion picture. The batch of film for a motion picture should have consistent properties throughout, as is well known in the art.

Figure 3A:
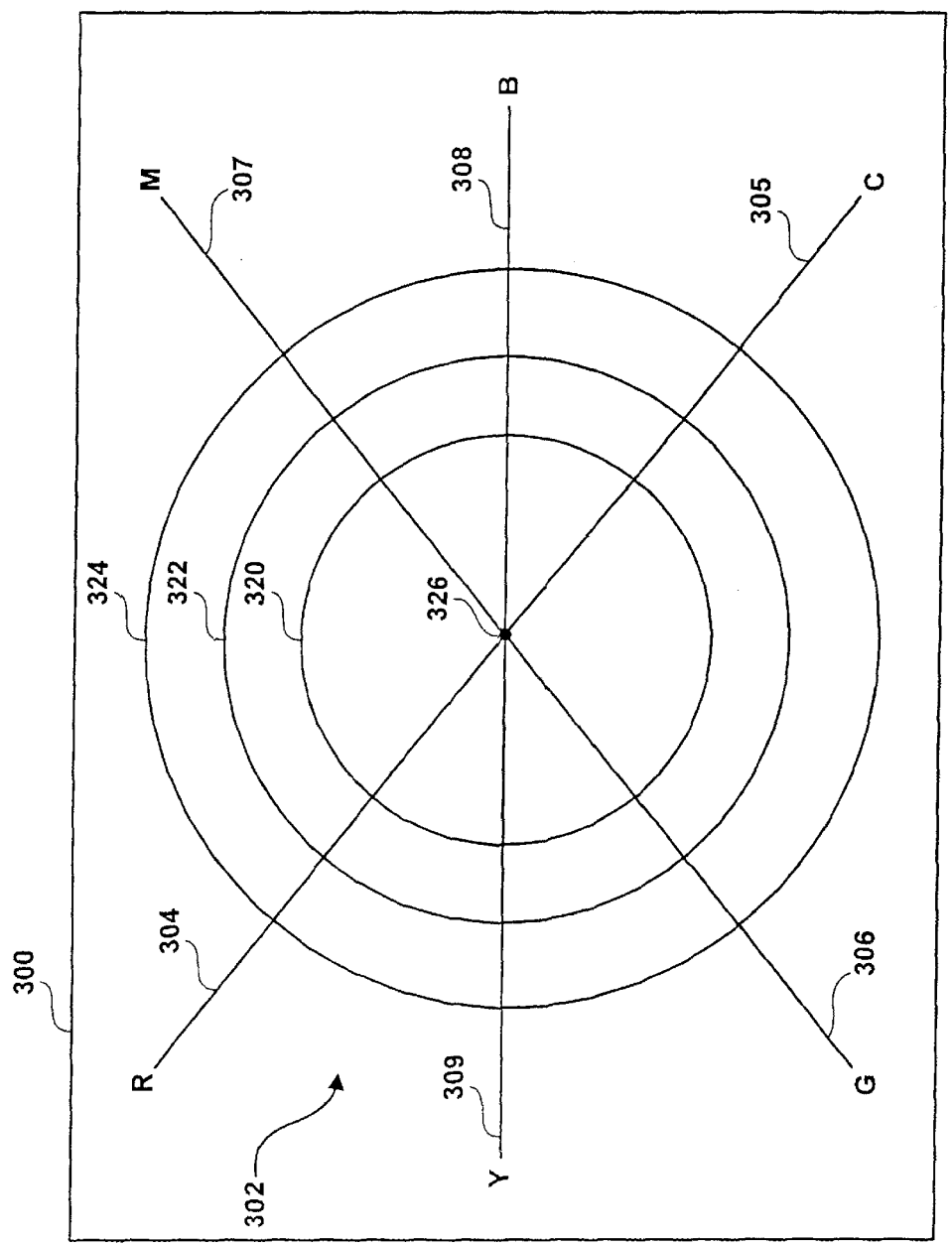
FIG. 3A is an example representation of a color space as displayed on a vectorscope.

A vectorscope display shows the representation for a particular color correction device of the colors in an image. An example of a vectorscope display is shown in FIG. 3A. The display 300 includes a color wheel 302 on which a representation of the colors in an image a particular color correcting device may have may be displayed in a readily readable format. The color wheel 302 may include various axes of a particular color space. The color wheel 302 may include the principle axes red, green and blue, shown as axes 304, 306 and 308, respectively. The color wheel 302 of the vectorscope display 300 may also include secondary axes/or cyan, magenta, and yellow, 305, 307, and 309, respectively. The secondary axes are the complimentary colors of the primary colors. For example, blue and yellow are complimentary colors because they appear on opposite sides of the color wheel 302.

The color wheel 302 also includes, in this example, three concentric circles, 320, 322, 324, which, respectively, lie a greater distance from the center point 326 of the color-space 302. The center point 326 represents "neutral" for the color wheel 302. Neutral, as is well known in the art, refers to the vertical brightness scale (not shown) which varies from black at its bottom to white at its top (i.e., the luminance of the color gamut) in much the same manner as the gray scales 202 and 204 of FIG. 2. The concentric circles 320, 322, and 324, represent various different values of chroma saturation that increase as one moves outwardly from the center point 326 and may correspond to the amount of color added by various CC filters. The circles are shown here only for ease of explanation and in no way serve to limit the present invention.

Figure 3B:
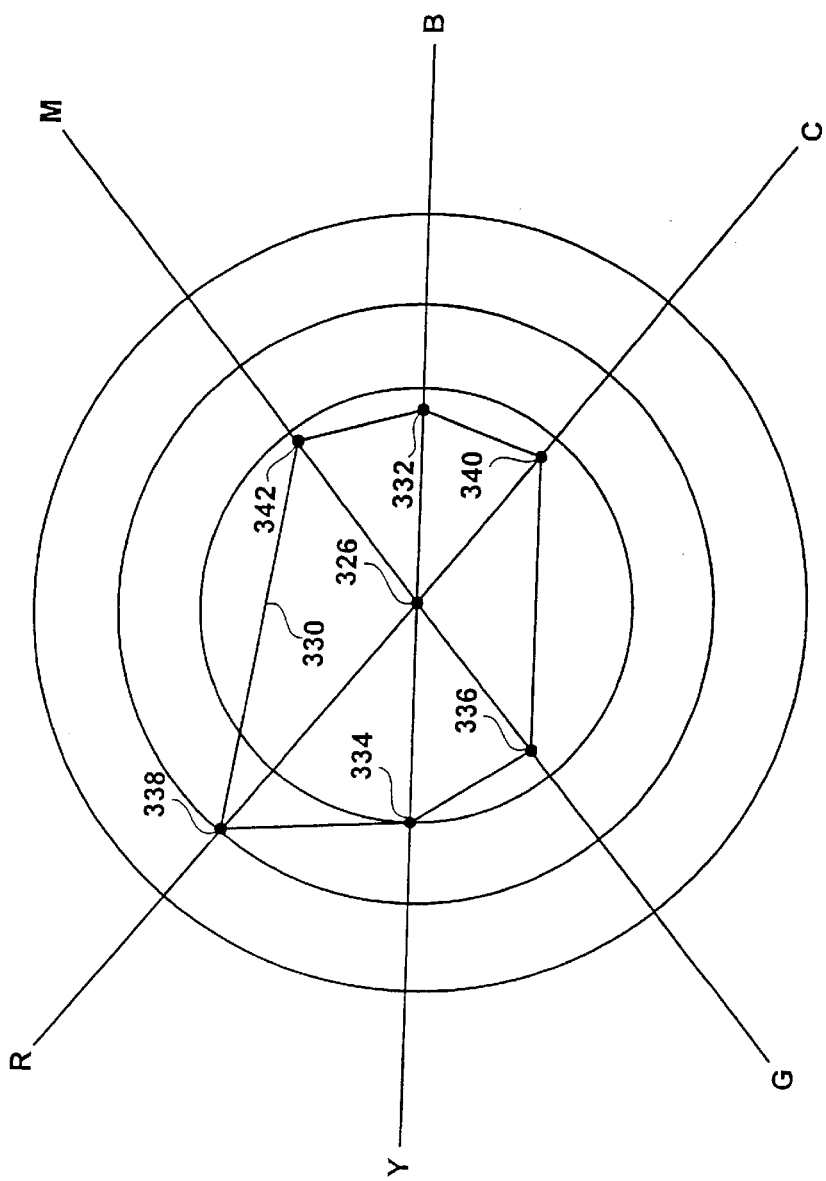
FIG. 3B is an example representation of a color space as displayed on a vectorscope and including a representation of a color response of a known standard.

FIG. 3B shows the color wheel 302 of FIG. 3A including an example of a graphical representation of the colors present in at image 330 that a particular color correcting device may have. This graphical color representation 330 could be to an image of a known standard such as the color chart of FIG. 2. The point on any given axis where the graphical color representation 330 intersects an axis shall be referred to herein as a gamut point. FIG. 3B includes six gamut points; a blue gamut point 332, a yellow gamut point 334, a green gamut point 336, a red gamut point 338, a cyan gamut point 340, and a magenta gamut point 342. The number of gamut points is not fixed.

Each gamut point is a distance away from the center point 326. The distance any given gamut point is from the center point 326 shall be referred to herein as an axis offset. As discussed below, an axis offset is equal to the amount a given representation is shifted along axis in order to null the color from the representation of the image. An example of an axis offset is the red axis offset 344 that is equal to the distance between the red gamut point 338 and the center point 326.

Figure 3C:
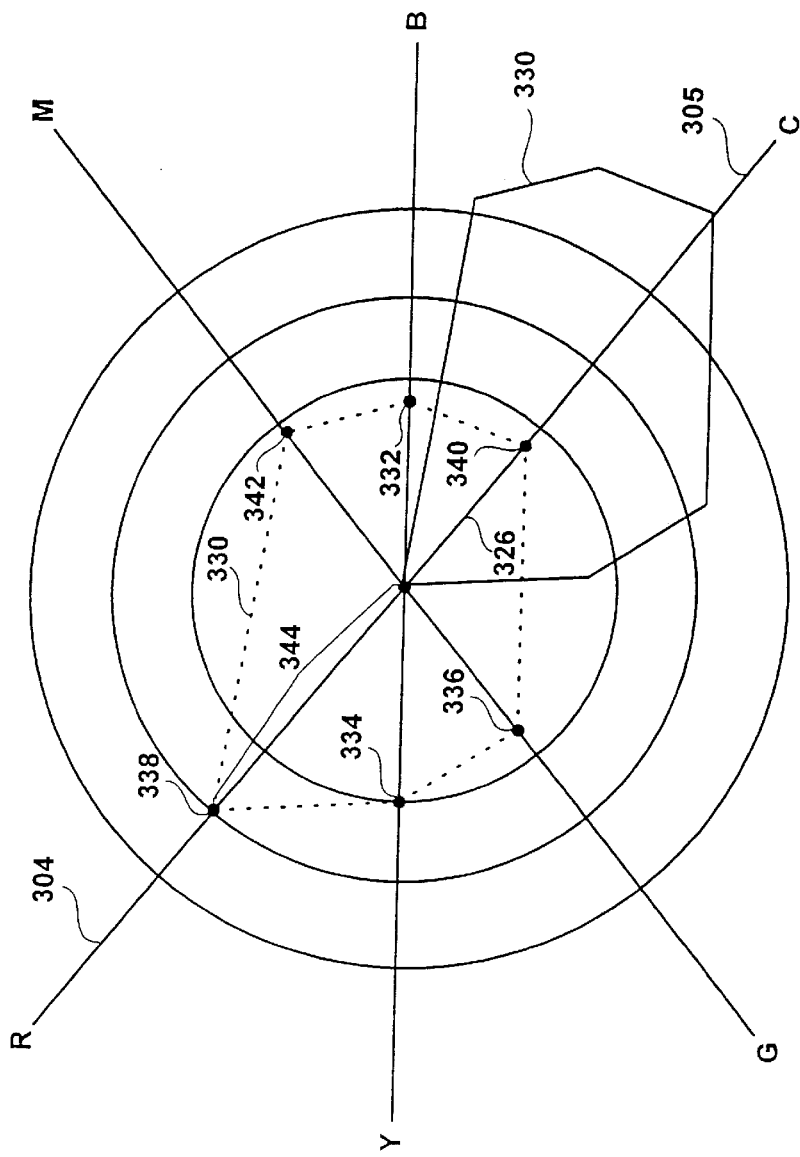
FIG. 3C is shows a representation of the color response of FIG. 3B after it has been subjected to a null test along one axis of the color gamut of a color correcting device.

As shown in FIG. 3C, the color representation 330 of FIG. 3B has been shifted along the cyan axis 305 an amount equal to the axis offset 344 of the red gamut point 338. In FIG. 3C the original color representation of FIG. 3B is shown in dashes. This offset is retained and is the "null value" for the red axis 304 used to map color correction instructions from one device to another discussed in greater detail below.

Figure 4A:
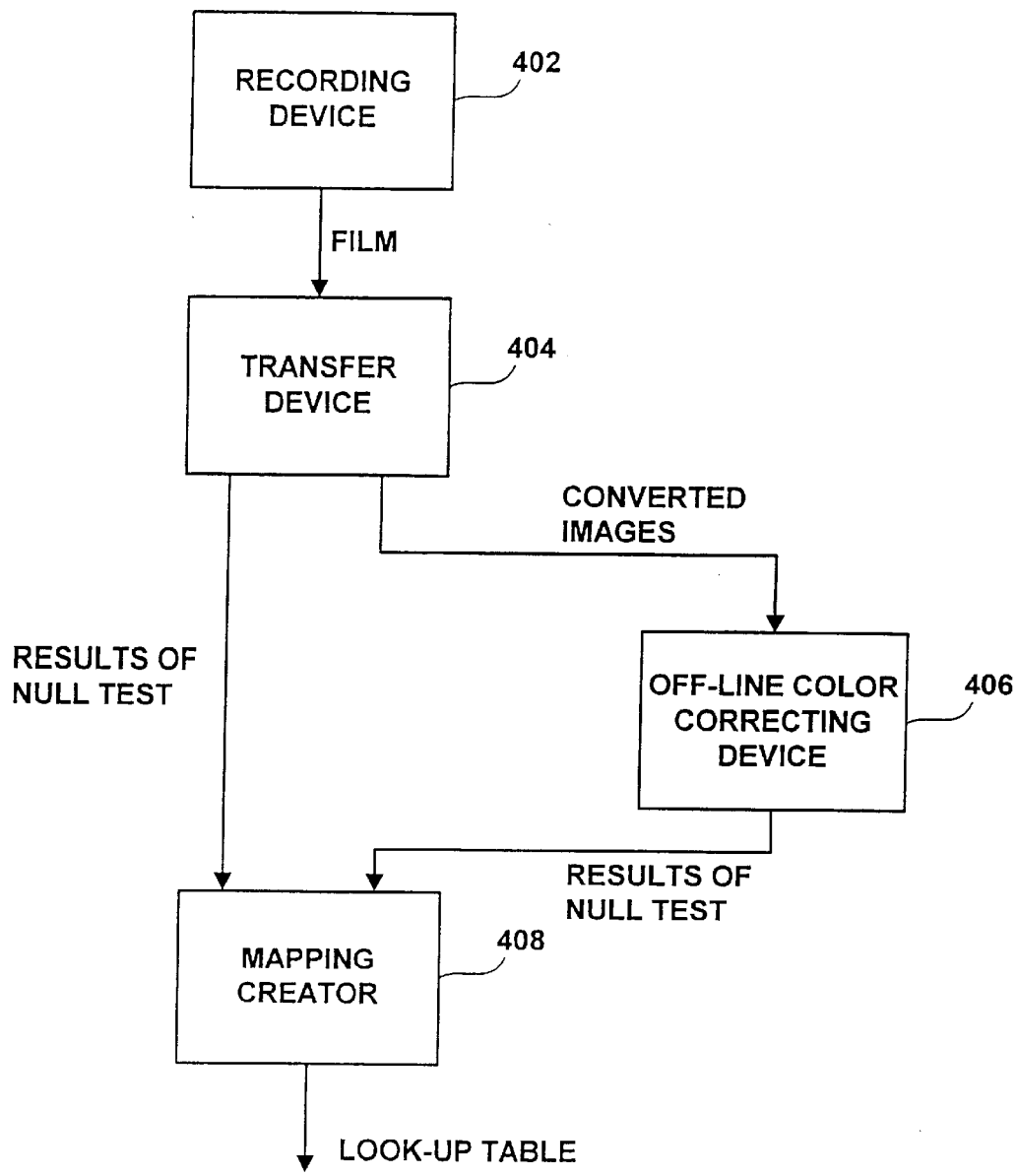
FIG. 4A is a block diagram representation of a system according to an example embodiment.

Referring now to FIG. 4A, one embodiment of a color correction system 400 is shown in block diagram format. The system 400 includes a recording device 402 that is capable of recording an image on a visual data recording medium. The recording device 402 may be a motion picture camera, a video camera, or the like. The recording device 402 may record an image of ithe known standard on the visual data recording medium which the recording device 402 uses. In this example the medium is film, butother mediums such as a computer readable medium may also be appropriate.

The images that comprise the known standard may be created, as described above, by recording an image of an object such as a grayscale chart through various filters. Alternatively, an image of the known standard may be created by recording an image of a color chart as described above, such as the color chart described in connection with FIG. 2.

The film in this example is processed by a transfer device 404. The transfer device converts the images recorded on the film to a digital representation which may be stored on an electronic storage medium such as video tape, a disk, a computer memory, video tape, DVD and the like. The transfer device 404 may include color correction capabilities and, thus, may be also be a color correcting device which is capable of performing a nulling test. The transfer device 404 may be, for example, a telecine machine. One such telecine machine is the Datacine telecine made by Phillips which converts traditional film to video tape.

The digital representation may then be passed to an off-line color correcting device 406 such as an Avid Symphony digital editing system. Both the transfer device 404 and the off-line color correcting device 406 perform a null test on their respective color interpretations of an image of the known standard. A manual nulling test will now be described with reference to FIGS. 3A–3C. The nulling test also may be automatically performed by software that performs the manual operations described herein.

As a user nulls, for example, along the cyan axis 305 an input dial or lever is used to shift the representation 330 along the axis. Nulling along the cyan axis 305, for example, reduces the amount of cyan present in the color response 330. If the color representation 330 is shifted so that no portion of it extends along the cyan axis 305, all the cyan has been nulled from the color representation 330. This null testing may be repeated along each axis presented in the color wheel 302. However, the null testing may be performed along fewer than all axes. For example, conducting a null test along only one or two axes may suffice.

If only two axes, for example, are nulled then the offset on the compliment of the axes is the same offset in the other direction. For example, if the red null was 148 and the center point 326 is assigned 128 then the cyan offset would be 108.

The amount of offset that had to be implemented by the color correcting device is retained for later use. These results of the nulling operation/test and the range may stored in a "meta-file." Meta-files are well known in the art of digital film making and are most generally files that include information about and are associated with a given film. Examples of meta-data formats are U.S. Pat. No. 5,724,605, and Open Media Framework (OMF) and Advanced Authoring Format (AAF) standards, the specifications of which are hereby incorporated by reference.

The results of the null test from the transfer device 404 and the off-line color correcting device 406 are both passed to a mapping creator 410. Most generally, the mapping creator 410 creates a table that calibrates color correction instructions from color correcting to device so that the instructions may be duplicated on a second color correction device. The mapping creator 410 is described in greater detail below.

Figure 4B:
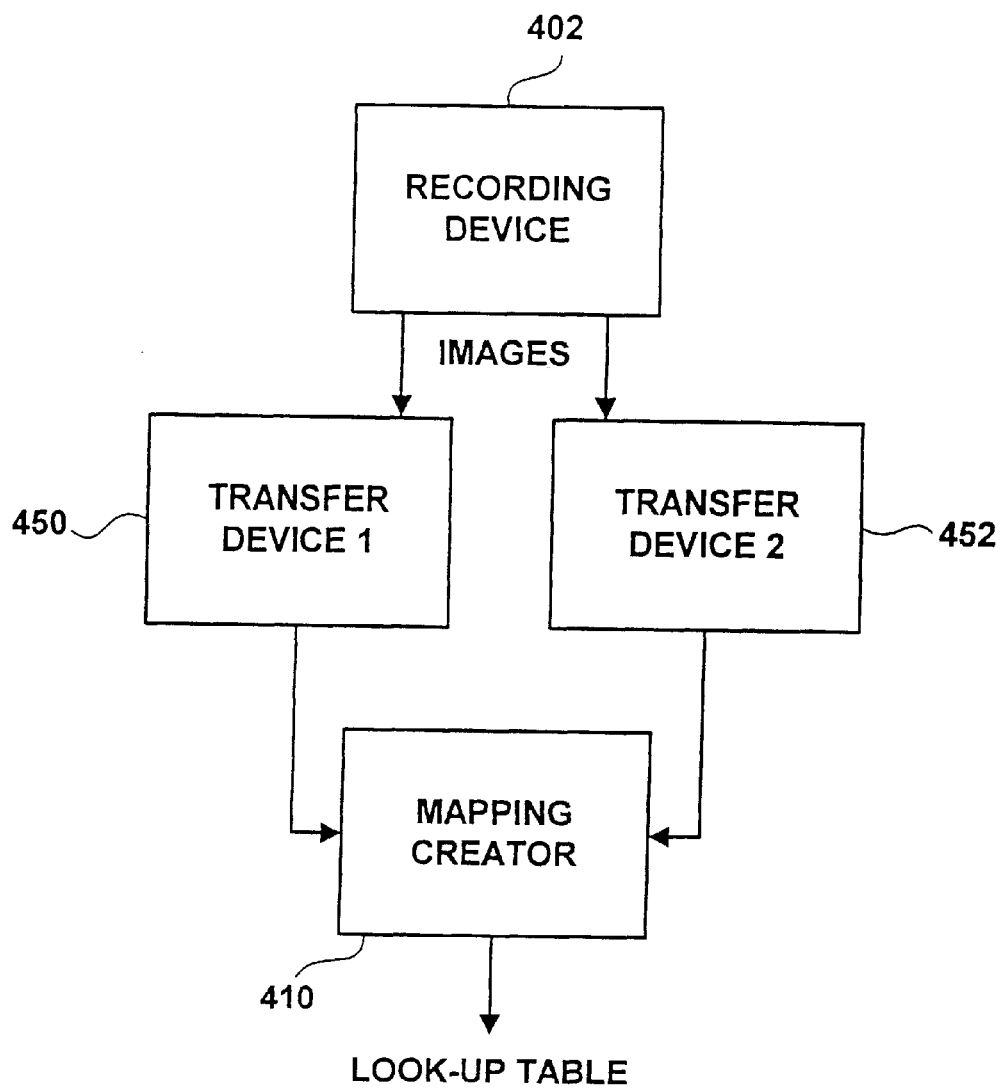
FIG. 4B is a block diagram representation of a system according to another example embodiment.

Another embodiment of a color correcting system 400 is shown in FIG. 4B. In this embodiment, the recording device 402 may be a motion picture camera that records images on film. The system 400 also includes a first transfer device 450 and a second transfer device 452. Each of these devices may have color correction capabilities. The first transfer device 450 may transfer film to, for example, video (e.g., a telecine) and the second transfer device may transfer film to, for example, HDTV format. Both devices perform a nulling test on the portion of the film that contains the known standard and the results passed to the mapping creator 410. In one embodiment, the mapping creator 410 creates a look-up table which correlates color correction instructions from the first transfer device so that they may be closely or exactly replicated on a second transfer device. In the past, color correction was typically conducted each time the film was transferred to a different visual data recording medium for distribution. For example, when the film was transferred to video tape a colorist operated a telecine machine to color correct the converted copy. If and when the film is transferred to another visual data recording medium, such as DVD, a colorist again operated the transfer device that transfers from film to DVD. By using the results of a nulling test, a colorist is not needed for the second transfer because all of the color corrections made when the film was converted to video tape (these corrections being saved in a file associated with the film) may be replicated on the second device during the second transfer.

Figure 5:
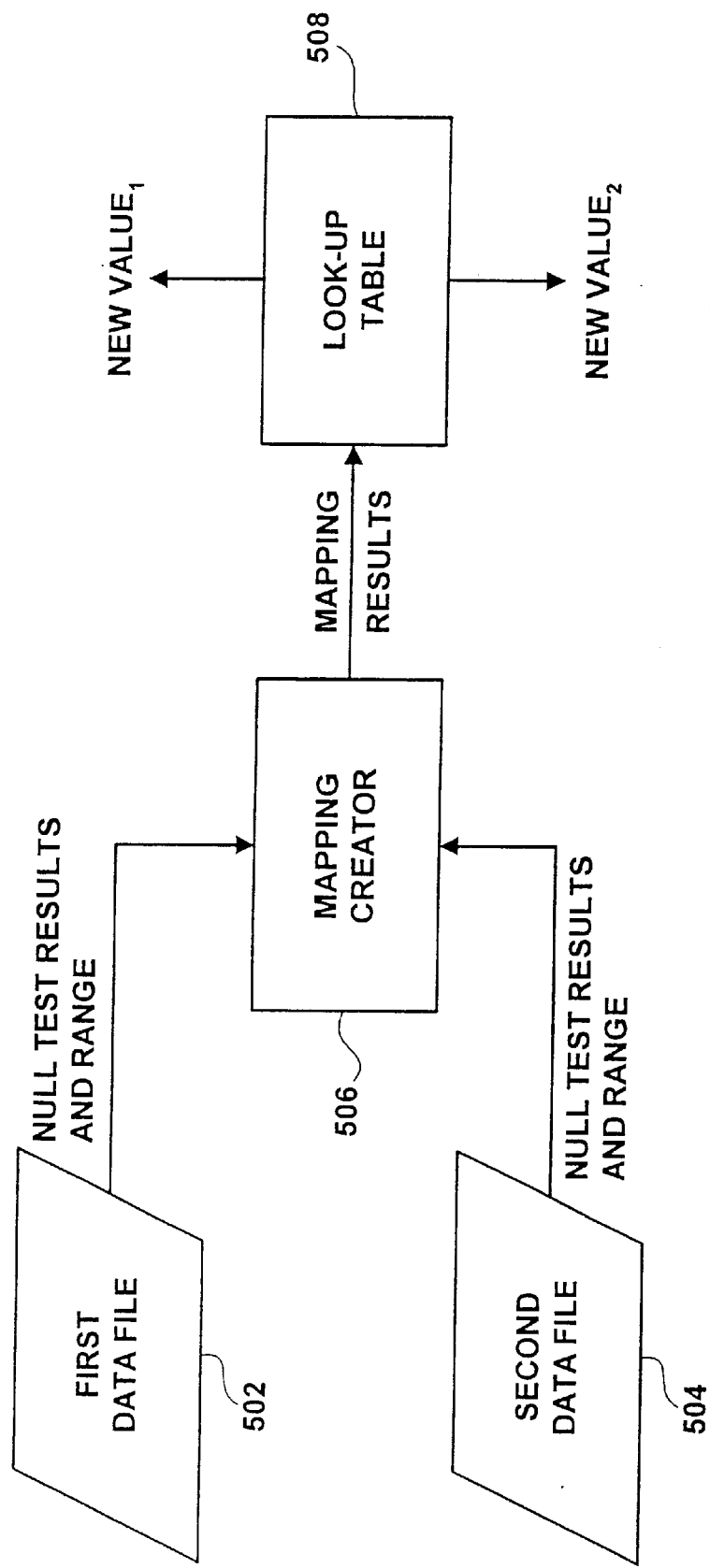
FIG. 5 is a block diagram representation of a portion of the system of an example embodiment which creates a look-up table.

FIG. 5 is a more detailed depiction, in block diagram format, of one embodiment of the process by which a look-up table may be created. The results of a nulling test on a first color correcting device are included in the first data file 502. As discussed above, the data file may be associated with the motion picture. The first data file 502 may also include color correction information stored during a color correction process performed on the first color correcting device. For instance, the file may "point" to a specific frame or frames of the motion picture and specify that the amount of blue in the frame(s) should be increased by a certain amount. The amount of increase is a representation of the amount the user of a first color correcting device increased the blue and is expressed as a value that equals the total amount of blue and is based upon the particular range and scale of the first color correcting device. The first data file 502 may also include a numerical range of the possible color values for the first color correcting device. the first data file 502 may an entry that lists the value assigned to the center point of the range of the first color correcting device.

A second data file 502 is also associated with the motion picture. In one embodiment, the second data file may be included in or linked to the first data file 100. This second data file 504 may include the results of the nulling test performed on a color interpretation of the same known standard as the nulling test was performed by the first color correcting device. The second data file 504 also may include the range and the value assigned to the center point of the range of the second color correcting device.

A mapping creator 506 receives the results of the null test from files 502 and 504, as well as the range of the first and second color correcting devices, and may create a look-up table 508. The mapping creator 506 may be included in the first color correcting device, the second color correcting device, both devices or may be a stand alone unit. However, the conversions may be implemented by hand or using software configured to perform the conversions based on the various operations discussed in greater detail below. In some embodiments, the color correcting devices may include either or both an information input and an information output so that color correction information as well as null test information may be transferred from or received by the color correcting device. For example, if one of the color correcting devices is a telecine corrector, such as those made by DaVinci, Inc., such a corrector may include an information input to receive color correction and null test data from a first color correcting device such as an Avid Symphony.

The mapping creator 506 may receive the range and null test results in a variety of manners. For instance, a user may input the information manually or the file(s) may be transferred from either or both of the color correcting devices electronically by known means such as via a data-modem, FTP, by inserting a diskette with information contained thereon and the like.

After the mapping creator 506 has received the results of the null test and. the range from each color correcting devices, the look-up table 508 may be created. The look-up-table 508 is created such that whenever a new color correction instruction is obtained from a first device (New Value$_1$) the same effect can be achieved by implementing a color correction of New Value$_2$ (the output of the look up table) on a second color correcting device. The look-up table maps possible input values from the range of the first color correcting device to corresponding values for the second device. For example, the user of a first color correcting device may determine that 36 frames of a motion picture in the middle of the film need to have more blue added to them. Using a color correcting device, while viewing these 36 frames, the user may alter the color values for these frames. This new "blue gain" level is associated with the 36 frames and may be stored in a meta data file associated with the motion picture. The first device may be, for example, a digital editing system. However, the new blue level change also may be implemented on the second device, for instance, if the motion picture is transferred to video tape. Blue may be added by the first device such that the amount of blue in the 36 frames is increased from an initial value (e.g., 150) to a final value of 180 on the first device. However, the second device may not understand what a value of 180 of blue gain correction means. The look-up table 508 converts the blue value from the first device to a blue value (New Value$_2$) for the second device. The New Value$_2$ may be, for instance, 278. If blue is raised to a value 278 on the second device, the effect desired by the first user may be implemented by the second user without any subjective human interference.

Figure 6:
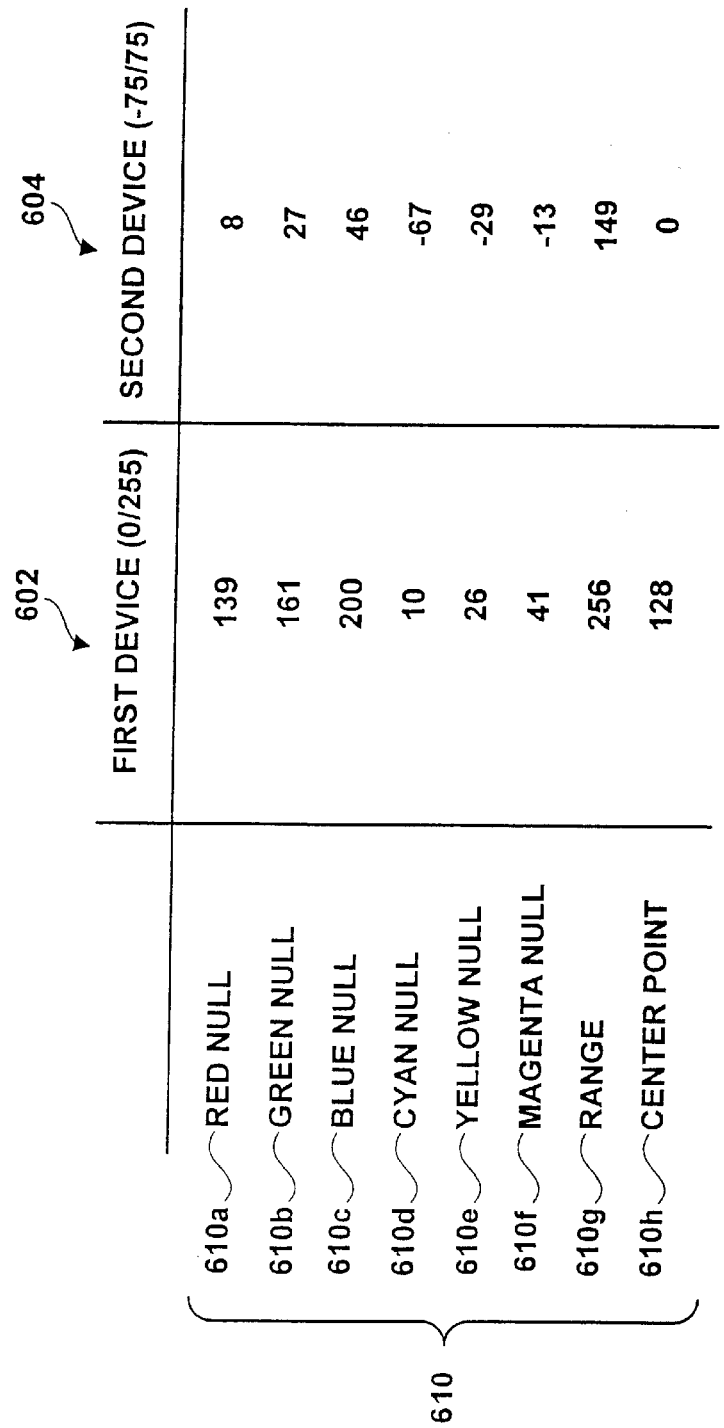
FIG. 6 is a table of example results of a null test performed on two devices and used to create a look-up table.

FIG. 6 is an example representation of the information used by the mapping creator to either map one color value of one device to a color value of another device or to create a look-up table. The information is in two columns; a first device column 602 which stores the results of the null test and the center point of the first device and a second device column 604 which stores the results of the null test and the center point of the second device. The data may be stored in any format and the columns of FIG. 6 are given by way of example only.

Each column includes a plurality of rows 610, each of which include one of the values from the null test, the range of the device, and the designation of the center point. For instance, the information included in the file of FIG. 6 includes, a red null row 610$a$, a green null row 610$b$, a blue null row 610$c$, a cyan null row 610$d$, a yellow null row 610$e$, a magenta null row 610$f$, each of which contain the results of the nulling operation performed along that axis. The file also includes a range of the device row 610$g$, and the value assigned to the center point in a center point row 610$h$. However, the center pointmay be determined from the range by simple mathematical algorithms instead of being stored in the file.

The information contained in this example file is enough to map any color correction made on either device to the other device. By having both devices perform the same test on the same known standard, the color interpretation of the known standard of each device is known as compared to the other. For instance, suppose the meta data file indicates that a specific frame needed to have a blue level of 221 blue units as defined by the first device. Given the data of FIG. 6 this "221 blue" would be converted to a value "55.6" for use on the second device by mapping the values using the process described in FIG. 7.

Figure 7:
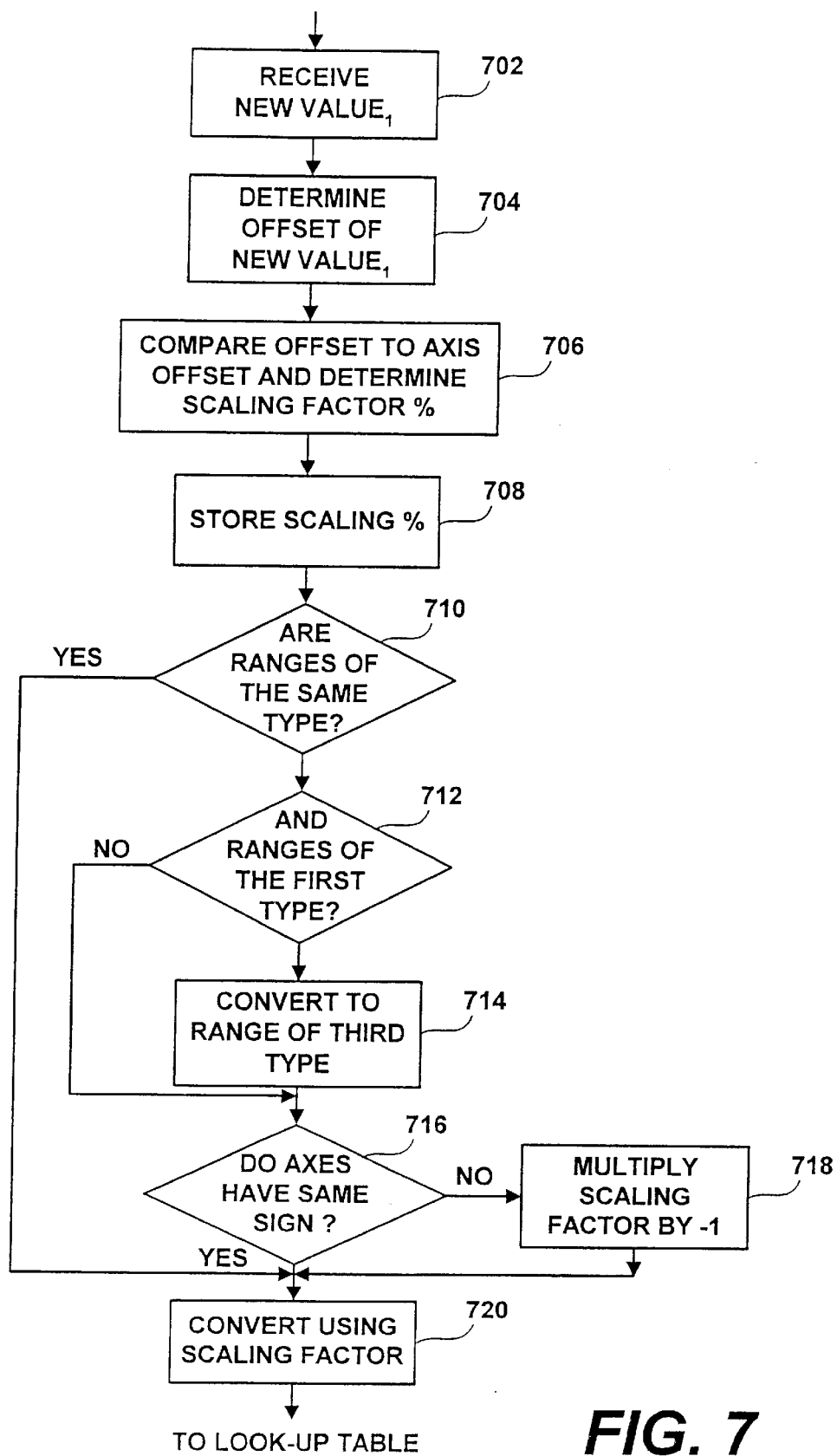
FIG. 7 is a flow chart of an example process by which a color correction instruction from one color correcting device may be calibrated to another color correction device.

FIG. 7 is a flow chart of a process by which the mapping creator may convert a color correction value from a first color correcting device into a color correction value that achieves the same color correction on a second color correction device.

At step 702 the look-up table receives a desired color correction value (New Value$_1$). This new value may be received from the first data file 502 (FIG. 5) or may be manually entered through an input of a device which performs the mapping operations. Then the amount by which the new value is offset from the center point is determined at block 704. For example, if the new value is a "blue 215" value the offset is 87 (the center point of the first device is 128 in FIG. 6). The offset value for the new value is then compared to the axis offset determined for blue during the nulling test at block 706. The offset along the blue axis determined from the nulling test results for the first device is 72 (e.g., 200–128). The new value is 121% larger than the null test result. This percentage is stored as a scaling factor in step 708.

Then, at block 710, a determination of whether the ranges of the two devices are of the same type. If the ranges are of the same type then the process progresses to block 720 for final conversion. Ranges are of the same type if they display the same types of characteristics. There are several different types of ranges. A first type is a range starts a zero at an endpoint of a first axis of the color wheel displayed on the vectorscope display and increases to some high value at the end point of the complementary axis of the first axis. For example, a first type of range may have a value of zero assigned to the end point of the cyan axis and a value of 300 assigned to the end point of the red axis. The range of the first device in FIG. 6 is of this first type. A second type of range is one that a center point assigned the value zero at the neutral center of a polar display and each axis has values that positively increase outwardly from the center point. A third type of range may a have a center point of zero and one of the axis of a complementary pair increasing positively to some high value and the other axis increasing negatively to some negative value. For instance, in the third type of range, the red axis may increase from zero to 128 and the cyan axis decreases from zero to −128. The range of the second device in FIG. 6 is of the third type. A range may be converted from a range of the first type to a range of the third type simply by subtracting the value assigned to the center point from the values along each pair of a complementary pair of axes.

If the ranges are not the same, at block 712 it is determined whether one of the ranges are of the first type. At this point, there is no possibility that both ranges could be of the first type because, if they were, the process would have progressed to block 720 from block 710. If one of the ranges is of the first type, it is converted to a range of the third type at block 714. If neither of the ranges are of the first type, processing progresses to block 716.

In either case, at block 716 it is determined whether the axis of interest (i.e., the axis of color correction) of the first device has values that have the same sign as the values on the same axis of the second device. If they do not, the stored scaling factor is multiplied by −1 at block 718 before final conversion in block 720.

At block 720 final conversion of the color correction value for the first device to a corresponding color correction value for the second device is conducted. The scaling factor stored at block 708 (and possibly modified at block 718) is multiplied by the result of the nulling test on the axis of interest of the second device. The resultant value is the color correction value that is input on the second color correcting device to duplicate the color correction conducted on the first color correction device.

This process may be repeated for several input values (i.e., the entire range of each axis) of the first device and the results stored in a look-up table so that the conversion may be almost instantaneous. Likewise, the process may repeated in a similar manner for the second device to create a look-up table that converts from the second device to the first device.

Having now described a few embodiments, it should be apparent to those skilled in the art that the foregoing is merely illustrative and not limiting, having been presented by way of example only. For example, the above description related to color corrections in the RGB/CYM color space, however, the teachings herein are applicable to any color space such as the HSL color space, the YCrCb color space, and the like. Furthermore, the specific conversion techniques described herein may be implemented in different manners depending upon the individual characteristics of the color correcting device being used. Numerous modifications and other embodiments are within the scope of one of ordinary skill in the art and are contemplated as falling within the scope of the invention.

What is claimed is:

1. A method for use in color correction of a motion picture, including:

nulling at least one color corresponding to at least one known color in an image in the motion picture including a known standard using a first device to obtain a first offset on at least one color axis, wherein the known standard is an object having at least one known color;

retaining the first offset in a manner associated with the motion picture;

receiving results of nulling of the at least one color corresponding to the at least one known color in the image in the motion picture including the known standard using a second device to obtain a second offset on the at least one color axis; and using the first and second offsets to generate a mapping of color correction information between the first and second devices.

2. The method of claim 1, further including:

receiving information describing a color correction operation on one of the first and second devices; and generating information, using the mapping, describing a color correction operation on the other of the first and second devices corresponding to the color correction operation on the one of the first and second devices.

3. The method of claim 2, further including:

performing a color correction operation using the first device and retaining information describing the color correction operation in a manner associated with the motion picture.

4. The method of claim 3, further including:

receiving information describing the color correction operation performed on the first device; and generating information, using the mapping, describing a color correction operation on the second device corresponding to the color correction operation performed on the first device.

5. A method for use in color correction of a motion picture, including:

nulling at least one color corresponding to at least one known color in an image in the motion picture including a known standard using a first device to obtain a first offset on at least one color axis, wherein the known standard is an object having at least one known color;

retaining the first offset in a manner associated with the motion picture;

nulling the at least one color corresponding to the at least one known color in the image in the motion picture including the known standard using a second device to obtain a second offset on the at least one color axis;

retaining the second offset in a manner associated with the motion picture; and using the first and second offsets to generate a mapping of color correction information between the first and second devices.

6. The method of claim 5, further including:

receiving information describing a color correction operation on one of the first and second devices; and generating information, using the mapping, describing a color correction operation on the other of the first and second devices corresponding to the color correction operation on the one of the first and second devices.

7. The method of claim 5, further including:

performing a color correction operation using the first device and retaining information describing the color correction operation in a manner associated with the motion picture;

generating information, using the mapping, describing a color correction operation on the second device corresponding to the color correction operation performed on the first device; and performing the color correction operation using the second device.

8. A method for use in color correction of a motion picture, including:

nulling at least one color corresponding to at least one known color in an image in the motion picture including a known standard using a first device to obtain a first offset on at least one color axis, wherein the known standard is an object having at least one known color;

retaining the first offset in a manner associated with the motion picture;

receiving information describing a mapping of color correction information between the first device and a second device;

receiving information describing a color correction operation on the first device; and generating information, using the mapping, describing a color correction operation on the second device corresponding to the color correction operation on the first device.

9. A method for use in color correction of a motion picture, including:

nulling at least one color corresponding to at least one known color in an image in the motion picture including a known standard using a first device to obtain a first offset on at least one color axis, wherein the known standard is an object having at least one known color;

retaining the first offset in a manner associated with the motion picture;

wherein the known standard includes a color chart including a gray scale and a plurality of color swatches, wherein each color swatch from the plurality of color swatches is a color located on one of a plurality of color axes, wherein there is at least one color swatch for each color axis, and wherein each color swatch has a gain region and a gamma region.

10. An apparatus for use in color correction of a motion picture, including:

means for nulling at least one color corresponding to at least one known color in an image in the motion picture including a known standard of a first device to obtain a first offset on at least one color axis, wherein the known standard is an object having at least one known color;

means for retaining the first offset in a manner associated with the motion picture;

means for receiving results of nulling of the at least one color corresponding to the at least one known color in the image in the motion picture including the known standard using a second device to obtain a second offset on the at least one color axis; and means, using the first and second offsets, for generating a mapping of color correction information between the first and second devices.

11. The apparatus of claim 10, further including:

means for receiving information describing a color correction operation on one of the first and second devices; and means for generating information, using the mapping, describing a color correction operation on the other of the first and second devices corresponding to the color correction operation on the one of the first and second devices.

12. The apparatus of claim 10, further including:

means for performing a color correction operation using the first device and retaining information describing the color correction operation in a manner associated with the motion picture.

13. The apparatus of claim 12, further including:

means for receiving information describing the color correction operation performed on the first device; and means for generating information, using the mapping, describing a color correction operation on the second device corresponding to the color correction operation performed on the first device.

14. An apparatus for use in color correction of a motion picture, including;

means for nulling at least one color corresponding to at least one known color in an image in the motion picture including a known standard of a first device to obtain a first offset on at least one color axis, wherein the known standard is an object having at least one known color;

means for retaining the first offset in a manner associated with the motion picture;

means for nulling the at least one color corresponding to the at least one known color in the image in the motion picture including the known standard using a second device to obtain a second offset on the at least one color axis;

means for retaining the second offset in a manner associated with the motion picture; and means, using the first and second offsets, for generating a mapping of color correction information between the first and second devices.

15. The apparatus of claim 14, further including:

means for receiving information describing a color correction operation on one of the first and second devices; and means for generating information, using the mapping, describing a color correction operation on the other of the first and second devices corresponding to the color correction operation on the one of the first and second devices.

16. The apparatus of claim 14, further including:

means for performing a color correction operation using the first device and retaining information describing the color correction operation in a manner associated with the motion picture;

means for generating information, using the mapping, describing a color correction operation on the second device corresponding to the color correction operation performed on the first device; and means for performing the color correction operation using the second device.

17. An apparatus for use in color correction of a motion picture, including:

means for nulling at least one color corresponding to at least one known color in an image in the motion picture including a known standard of a first device to obtain a first offset on at least one color axis, wherein the known standard is an object having at least one known color;

means for retaining the first offset in a manner associated with the motion picture;

means for receiving information describing a mapping of color correction information between the first device and a second device;

means for receiving information describing a color correction operation on the first device; and means for generating information, using the mapping, describing a color correction operation on the second device corresponding to the color correction operation on the first device.

18. An apparatus for use in color correction of a motion picture, including:

means for nulling at least one color corresponding to at least one known color in an image in the motion picture including a known standard of a first device to obtain a first offset on at least one color axis, wherein the known standard is an object having at least one known color;

means for retaining the first offset in a manner associated with the motion picture;

wherein the known standard includes a color chart including a gray scale and a plurality of color swatches, wherein each color swatch from the plurality of color swatches is a color located on one of a plurality of color axes, wherein there is at least one color swatch for each color axis, and wherein each color swatch has a gain region and a gamma region.

19. A method for use in color correction of a motion picture, including:

receiving results of nulling at least one color corresponding to at least one known color in an image in the motion picture including a known standard using a first device to obtain a first offset on at least one color axis, wherein the known standard is an object having at least one known color;

receiving results of nulling the at least one color corresponding to the at least one known color in the image in the motion picture including the known standard using a second device to obtain a second offset on the at least one color axis; and using the first and second offsets to generate a mapping of color correction information between the first and second devices.

20. The method of claim 19, further including:

receiving information describing a color correction operation on one of the first and second devices; and generating information, using the mapping, describing a color correction operation on the other of the first and second devices corresponding to the color correction operation on the one of the first and second devices.

21. The method of claim 20, further including:

performing the color correction operation using the other of the first and second devices.

22. An apparatus for use in color correction of a motion picture, including:

means for receiving results of nulling at least one color corresponding to at least one known color in an image in the motion picture including a known standard using a first device to obtain a first offset on at least one color axis, wherein the known standard is an object having at least one known color;

means for receiving results of nulling the at least one color corresponding to the at least one known color in the image in the motion picture including the known standard using a second device to obtain a second offset on the at least one color axis; and means, using the first and second offsets, for generating a mapping of color correction information between the first and second devices.

23. The apparatus of claim 22, further including:

means for receiving information describing a color correction operation on one of the first and second devices; and means for generating information, using the mapping, describing a color correction operation on the other of the first and second devices corresponding to the color correction operation on the one of the first and second devices.

24. The apparatus of claim 23, further including:

means for performing the color correction operation using the other of the first and second devices.

* * * * *